Figure 1:
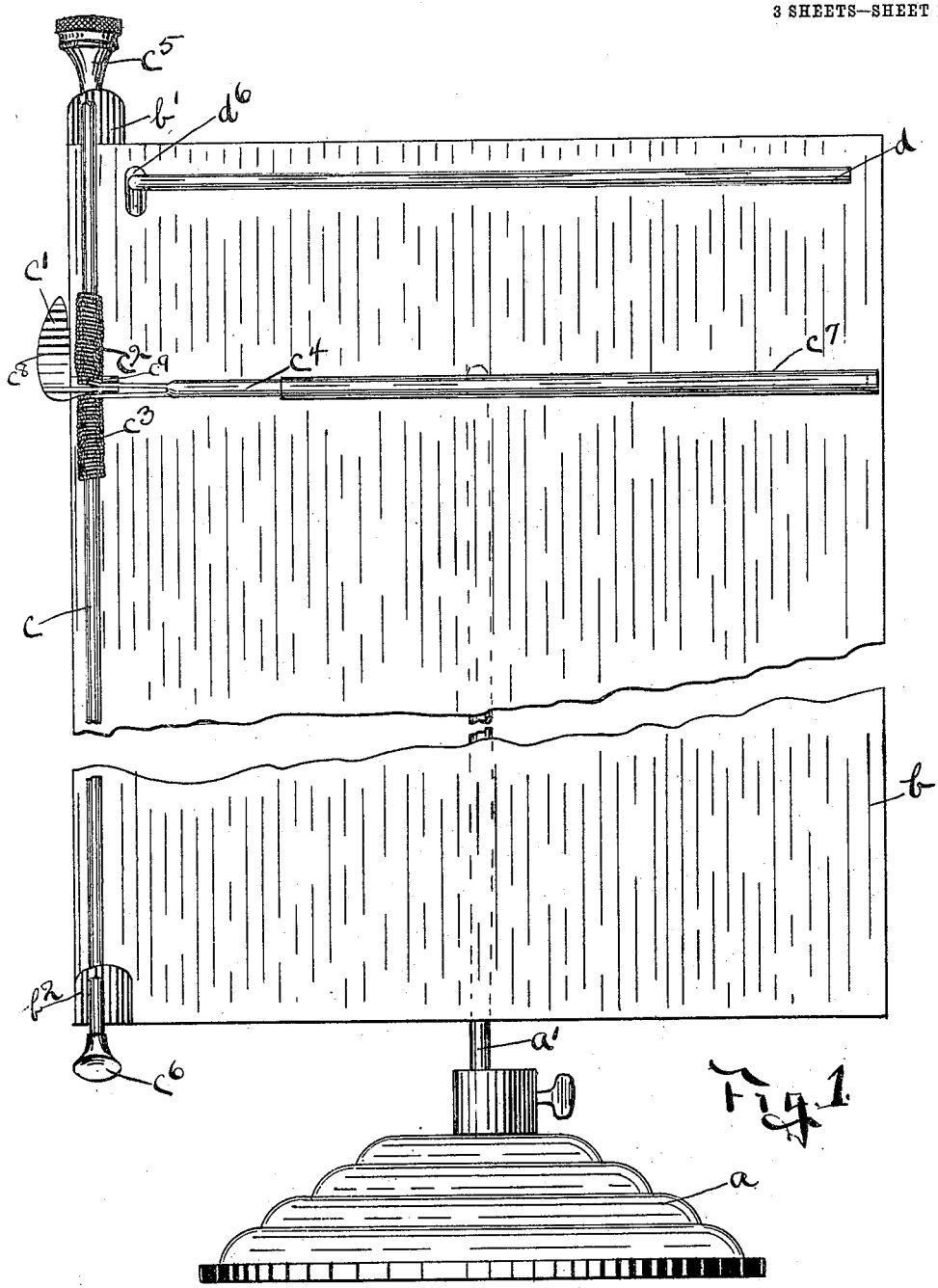

No. 820,066. PATENTED MAY 8, 1906.
A. B. REID.
STENOGRAPHER'S COPY HOLDER.
APPLICATION FILED JUNE 18, 1900.

3 SHEETS—SHEET 1.

WITNESSES: INVENTOR
Arthur B. Reid
BY
Jones & Addington
ATTORNEYS.

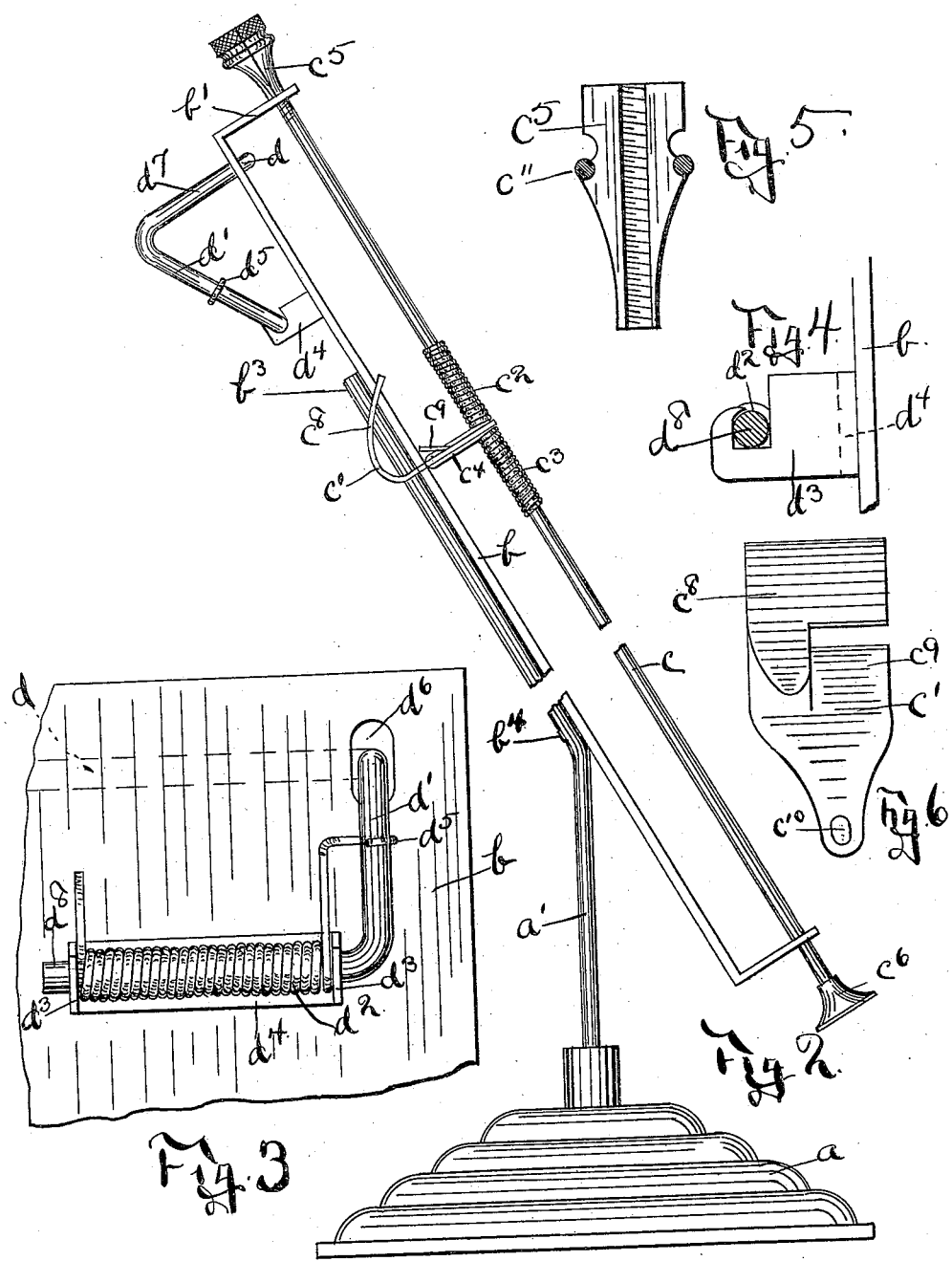

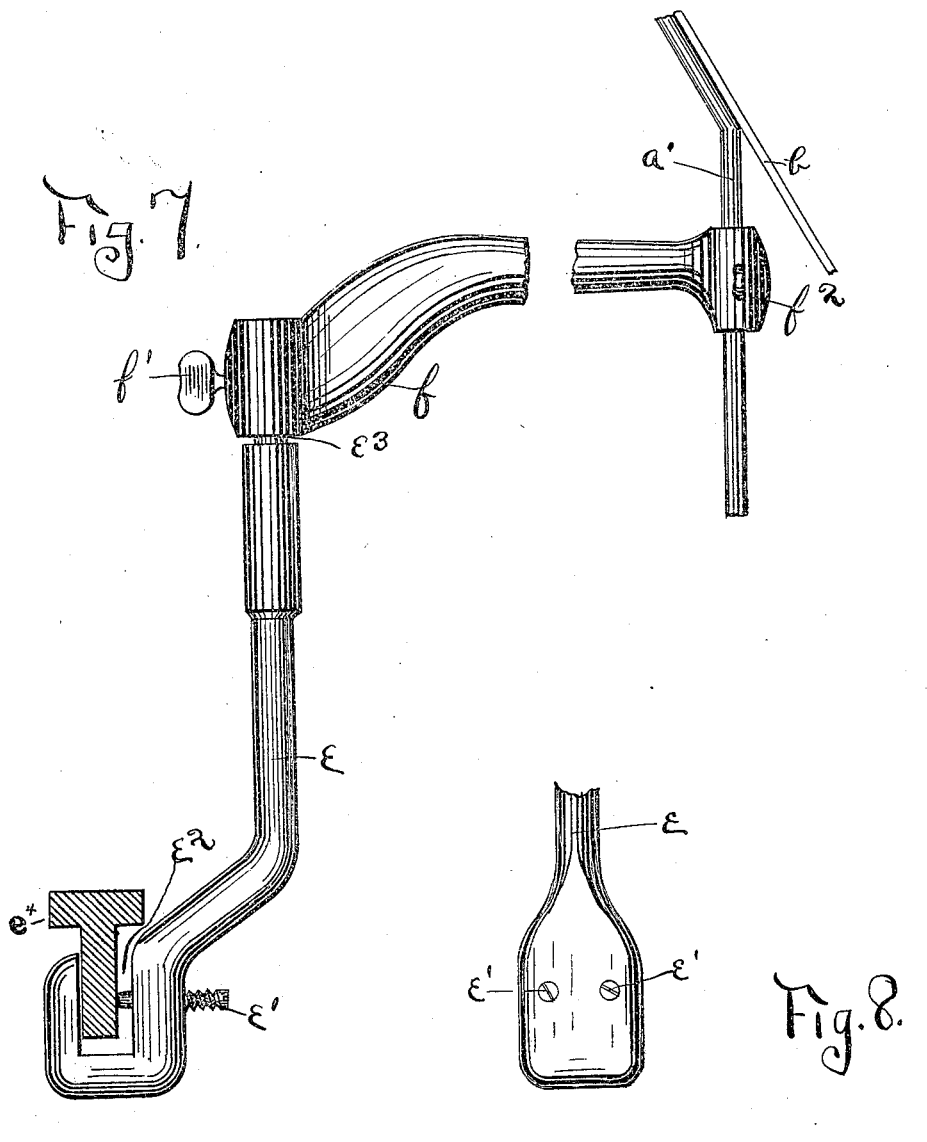

UNITED STATES PATENT OFFICE.

ARTHUR B. REID, OF CHICAGO, ILLINOIS.

STENOGRAPHER'S COPY-HOLDER.

No. 820,066.  Specification of Letters Patent.  Patented May 8, 1906.

Application filed June 18, 1900. Serial No. 20,706.

*To all whom it may concern:*

Be it known that I, ARTHUR B. REID, a citizen of the United States, residing at Chicago, in the county of Cook and State of Illinois, have invented a certain new and useful Improvement in Stenographers' Copy-Holders, of which the following is a full, clear, concise, and exact description, reference being had to the accompanying drawings, forming a part of this specification.

My invention relates to a stenographer's copy-holder, my object being to provide an improved form of holder for the note-book or document from which a copy is to be made..

Copy-holders of the general class to which the present invention relates have generally been made heretofore with a supporting-plate against which the book or document is adapted to rest, a suitable clamping device being provided at the upper end of the plate for securing the copy in position.

The present invention contemplates an improved form of locking device whereby the copy may be securely held in position, and, further, contemplates a new and improved form of line-indicator adapted to be moved step by step from the top to the bottom of the copy as the same rests upon the supporting-plate.

A further feature of my invention is to provide a construction which will obviate the objectionable vibration incident to copy-holders of this class as commonly employed heretofore. Since the copy-holder is usually placed upon the desk or table upon which the type-writer is mounted or mounted upon the machine itself, the copy-holder is subjected to a continuous jarring and shaking which tends to produce a vibration of the supporting-plate and a consequent vibration of the copy, which renders the reading of the copy difficult, and, moreover, has a fatiguing effect upon the eyes of the operator. In accordance with the present invention I obviate this vibration of the supporting-plate by providing the rod or standard which supports the plate with an extension extending along the back of the plate and serving as a brace to reinforce the plate and render the same rigid, so that the vibration thereof is prevented.

A further feature of my invention is the provision of a form of copy-holder which may be readily supported either in a base-plate or in a bracket or arm adapted to be secured to the machine, and, moreover, to provide means whereby the supporting-plate may be readily adjusted in height.

I have illustrated my invention in the accompanying drawings, in which—

Figure 1 is a front view of the device of my invention. Fig. 2 is a side view thereof. Fig. 3 is an enlarged view of the rod for holding the note-book or paper in position. Fig. 4 is an enlarged view of the bearing for said rod. Fig. 5 is a detail view of the nut used to adjust the line-indicator. Fig. 6 is a detail view of the clutch for controlling the line-indicator. Fig. 7 is a view of the adjustable support or bracket for attaching the device of my invention to a type-writer or other part. Fig. 8 is a partial view thereof.

Like letters refer to like parts in the several figures.

In the base-plate $a$ is mounted a rod or standard $a'$, whose upper end is bent and extends along the middle of the back of the supporting-plate $b$, to which it is riveted at the points $b^3$ $b^4$, thus giving the structure the desired rigidity. To hold the note-book or paper in position, I provide a rod $d$, which normally lies flat upon the plate $b$. The rod is bent at one end and the part $d^7$ thereof continued through the hole $d^6$ in the plate $b$. The rod is then bent down and the pivotal part $d^8$ formed so as to fit close to the back of the plate $b$. To the back of the plate $b$ is riveted a strip $d^4$, which is provided with bearings $d^3$ at either end. In placing the rod $d$ in position it is threaded through the hole $d^6$, the pivotal part $d^8$ fitted into the bearings $d^3$, and the mouths of the bearings bent so as to hold the rod in position, as seen more clearly in Fig. 4. The pivotal part $d^8$ is further fitted with a spiral spring $d^2$, one end of which, $d^5$, is attached to the part of the rod $d$ and which acts to keep the rod $d$ pressed against the plate $b$. The transversely-extending portion $d'$ $d^7$ of the rod forms a handle or finger-piece, which may be readily engaged by the hand to raise the rod $d$ to permit the note-book or copy to be inserted thereunder.

At both the upper and lower left-hand corners of the plate $b$ are the extensions or strips $b'$ and $b^2$, which are bent at right angles to the surface of the plate $b$. Through these strips $b'$ and $b^2$ is journaled the rod $c$, which is threaded and fitted at the upper end with a split nut $c^5$, the parts of which are held in position by a spring-ring $c^{11}$, and at the lower end with a finger-piece $c^6$. The amount of reciprocation of the rod $c$ may be regulated by screwing the nut $c^5$ up or down. I also provide a rod or line-indicator $c^4$, to one end of which are secured two wires $c^2$ $c^3$. These wires are formed into spirals which are normally not in alinement, but at a slight angle with each other, and thus when slipped over the rod $c$ they tend to frictionally engage and clamp the rod $c$ and hold the line-indicator $c^4$ in position. These spirals further act as a hinge, whereby the rod $c^4$ may be thrown back out of the way. The line-indicator is adapted to be moved downward step by step as the rod $c$ is reciprocated, and to accomplish this movement I employ a clutch which prevents the upward movement of the line-indicator as the rod $c$ ascends, while permitting the line-indicator to descend with the rod. To prevent the upward movement of the line-indicator when the rod $c$ ascends, I provide a clutch $c'$, having an opening adapted to inclose the edge of the plate $b$, and a hole $c^{10}$, through which the rod $c$ passes. The clutch is further provided with the arm $c^8$, having a shoulder adapted to engage the plate $b$ to limit the rocking movement of the clutch, and the projecting jaw $c^9$, adapted to engage the face of the plate $b$.

The operation of my invention is as follows: When it is desired to insert a note-book or paper into the holder, the part $d'$ is pressed toward the plate $b$. This motion forces the rod $d$ away from the plate $b$ and permits the note-book to be inserted. When the pressure on the rod $d'$ is released, the spring $d^2$ draws the rod $d$ back and holds the paper in position. When it is desired to move the line-indicator, the rod $c$ is moved up by pressure upon the finger-piece $c^6$. As the rod $c$ is moved up the spirals $c^2$ $c^3$ tend to move up with the rod and carry with them the clutch $c'$. The clutch $c'$, however, having a slight freedom of movement is rocked so as to throw the jaw $c^9$ into contact with the plate $b$, thus preventing further movement of the clutch $c'$, and thus of the spirals $c^2$ $c^3$ and the rod $c^4$. The further upward movement of the rod $c$, therefore, causes the same to slide freely through the spirals $c^2$ $c^3$. When no further upward movement of the rod $c$ is possible and the pressure on $c^6$ is released, the rod $c$ falls until stopped by the nut $c^5$, carrying with it the spirals $c^2$ $c^3$, the rod $c^4$, and the clutch $c'$, the jaw $c^9$ of the clutch offering no opposition to the downward movement of the clutch and associated parts. When the line-indicator by successive steps has reached the bottom of the page, the arm $c^8$ may be pressed so as to free the jaw $c^9$ from contact with the plate $b$ and the rod $c^4$ moved to the top of the page. The shoulder on the arm $c^8$ serves to limit the movement of said arm and to coöperate with the wall of the slot below the jaw $c^9$ to guide the clutch and prevent it from binding in moving upward to the top of the plate. The split nut $c^5$ may be moved up or down to lengthen or shorten the movement of the rod $c$, and thus the drop of the rod $c^4$, to accord with the different width of lines.

It being sometimes desirable to copy from an especially wide page, I have provided a sleeve $c^7$, running on the rod $c^4$. This sleeve may be moved to accommodate the different widths of paper.

It will be understood that the line-indicator of my invention is applicable to other forms of copy-holders than the one specifically shown and described herein, the reciprocating rod carrying the line-indicator, the clutch, and the part engaged thereby being a separable structure capable of employment in any place or on any device where it is desired to successively mark the lines or spaces on a copy.

I have also provided an adjustable support, which I have shown in Fig. 7, for attaching the copy-holder to the type-writer or other part. The curved arm $e$ is provided with a slot or channel $e^2$ at its lower end and a pair of set-screws or suitable clamping devices $e'$ $e'$. The channel $e^2$ being open at the upper end, the bar $e^4$ of the type-writer frame may rest therein, and the screws $e'$ $e'$ serve to clamp the arm securely in position. Since all type-writers have a lower bar, usually at the side of the keyboard, the arm may be readily attached to any form of type-writer, and the screws will accommodate the arm to any thickness of bar. Upon the upper end $e^3$ of the arm $e$ is adapted to clamp, by means of the thumb-screw $f'$, the arm $f$. The end $f^2$ of the arm $f$ has a hole or bearing through which the rod $a'$ is adapted to move. The arm $a'$ is of sufficient length to permit of considerable adjustment, and further latitude may be obtained by inverting the bar $f$.

Having described my invention, what I claim as new, and desire to secure by Letters Patent, is—

1. In a copy-holder, the combination with a suitable support for the copy of a rod arranged at the left-hand side of said support and extending from the bottom to the top thereof, a line-indicator slidably mounted upon said rod, means for operating said line-indicator from the left-hand side of said support, and a clamping-rod arranged upon the front of said support and to the right of the first-mentioned rod, said clamping-rod being provided with an operating-handle arranged in rear of said support at the left-hand side thereof, whereby said clamping-rod and said means may both be operated by the left hand and the first-mentioned rod will not interfere with the operation of the clamping-rod.

2. In a copy-holder, the combination with a supporting-plate, of a clamping-rod consisting of a part in front of said plate, a second part journaled upon the back of said plate and parallel to said first part, and an intermediate handpiece connecting the two parts and projecting from the back of said plate, said handpiece having two parts, one extending radially with said journal as a center, and the other in a direction tangential to said radius, substantially as described.

3. In a copy-holder, the combination with a supporting-plate having a portion at the corner bent to form a bearing, a reciprocating rod mounted in said bearing, and a line-indicator operated by the rod, of a clamping-rod having one part in front of said plate, another part fixedly journaled to the rear thereof, and an intermediate portion extending through a hole in said plate, said hole being situated in proximity to the bearing at the upper end of said plate whereby the rod may pass through the plate at a distance from the edge thereof without weakening said bearing, substantially as described.

4. In a copy-holder, the combination with a supporting-plate, of a clamping-rod having a part upon the front of said plate, a second part parallel thereto and upon the rear of said plate, and an intermediate part acting as a handpiece and projecting to the rear of said plate, substantially perpendicular to the plane passing through said two first-mentioned parts substantially as described.

5. In a copy-holder, the combination with a suitable support, of a longitudinally-extending rod mounted thereon, and a line-indicator having a pair of spiral coils of wire on the end thereof extending in opposite directions and adapted to surround said rod, and being laterally deflected so as to frictionally engage said rod, whereby said springs coöperate by their deflection to hold the line-indicator in any adjusted position substantially as described.

6. In a copy-holder, the combination with a suitable support, of a longitudinally-extending rod mounted thereon, a line-indicator having two spiral coils of wire on the end thereof adapted to surround said rod, and a clutch having a part surrounding said rod and situated between said spirals, substantially as described.

7. In a copy-holder, the combination with a stationary part, of a separate operating-rod, a clutch associated with said rod, means to cause the clutch to frictionally engage or grip said stationary part when said rod is moved in one direction, and to be released when said rod is moved in the opposite direction, and a line-indicator moving with said clutch, substantially as described.

8. In a copy-holder, the combination with a stationary part, of a reciprocating operating-rod mounted thereon and adapted to be moved in one direction by hand and in the opposite direction by gravity, a line-indicator mounted on said rod, and a clutch operated by said rod and adapted to engage said part when said rod is moved in one direction and released when said rod is moved in the opposite direction, substantially as described.

9. In a copy-holder, the combination with a supporting-plate, of an operating-rod mounted thereon, a line-indicator having a pair of spiral coils of wire on the end thereof, adapted to surround said rod and frictionally engage the same, a clutch adapted to surround said rod between said spirals and to engage said plate when said rod is moved in one direction and released when said rod is moved in the opposite direction, substantially as described.

10. In a line-indicator for copy-holders, the combination with a reciprocating rod, of a line-indicator carrying at the end a pair of spirals of wire extending in opposite directions and inclosing and frictionally engaging said rod, a clutch, a strip extending parallel to said rod with which said clutch is adapted to engage, said clutch being adapted to prevent the upward movement of said line-indicator when the rod is raised, while permitting the downward movement of said line-indicator when the rod descends, substantially as described.

11. In a copy-holder, the combination with a stationary part, of a reciprocating rod, a line-indicator, a clutch moving with said line-indicator and a frictional part moving with said clutch and line-indicator adapted to be frictionally engaged by said rod when the latter is moved in one direction to actuate said clutch and thereby cause it to grip said stationary part, whereby said rod is permitted to move relatively to said line-indicator and clutch, said frictional part serving to frictionally engage said rod when the same is moved in the opposite direction to cause said line-indicator to partake of the movement of said rod, substantially as described.

12. In a copy-holder, a copy-support, a reciprocating feed-rod arranged thereon, means to reciprocate said rod, a line-indicator carried by said feed-rod and moved thereby in one direction and means to prevent opposite movement of said line-indicator with the return movement of the feed-rod, substantially as described.

13. In a copy-holder, the combination with a copy-support, of a reciprocating feed-rod arranged thereon, a line-indicator carried by said feed-rod, means to lock the line-indicator to the feed-rod during the movement of said feed-rod in one direction and means independent of the feed-rod and coöperating with said indicator to normally prevent movement of the latter with the movement of said feed-rod in the opposite direction, substantially as described.

14. In a copy-holder, the combination with a suitable support for the copy, a single smooth reciprocating rod adapted to drop by gravity and means for raising it, and a line-indicator movable downward with said rod, and a clutch operated by said rod and adapted to engage a stationary part to hold said indicator while the rod is being raised, substantially as described.

15. In a copy-holder, in combination, a suitable support for the copy, a reciprocating rod, a line-indicator solely supported by said rod, a means for causing the line-indicator to move with said rod in one direction and for preventing movement of the line-indicator with the rod in the opposite direction.

16. In a copy-holder, a suitable support for the copy, a line-indicator, a reciprocating rod for operating the same and having a limited movement in bearings and having a threaded end, and a split nut engaging said threaded end and provided with means for resiliently pressing the two parts of the nut against said threaded end, whereby the length of movement of the rod may be adjusted by said nut and the nut securely held in the adjusted position, substantially as described.

17. The combination with a line-indicator and a stationary part, of a reciprocating rod for operating said line-indicator, and a clutch having the arm $c^8$ and the gripping-jaw $c^9$, said gripping-jaw adapted to engage one side of said plate when rocked in one direction, and said arm $c^8$ adapted to engage the opposite side of said plate to limit the rocking movement of the clutch and to guide the same in returning it to its initial position at the top of the plate, substantially as described.

18. The combination with a line-indicator and a stationary part having a substantially smooth surface, of a smooth reciprocating rod for operating said line-indicator, and a clutch associated with said indicator and rod, said clutch being actuated by said rod to grip the stationary part when said rod is moved in one direction whereby the rod may move relatively to the indicator, said rod when moved in the other direction being adapted to ungrip said clutch and to cause said line-indicator to move therewith, substantially as described.

19. The combination with a reciprocating rod, of a stationary part adjacent and parallel to said rod, a clutch member consisting of a strip of metal having an enlarged aperture through which said rod passes and a notch in one edge adapted to fit over the edge of the stationary part, and a jaw projecting from one side of said strip to engage said stationary part when the member is rocked in one direction in the reciprocation of the said rod and means to prevent the clutch from slipping upon the rod, substantially as described.

20. The combination with a reciprocating rod, of a stationary part adjacent and parallel to said rod, a clutch member consisting of a piece of metal having an opening through which the said rod passes and a notch adapted to fit over the edge of said stationary part, the said clutch being adapted to engage the stationary part during movement of the rod in one direction of its movement and to release the same and travel with the rod during its other movement and means to prevent the clutch from slipping upon the rod, substantially as described.

21. The combination with a reciprocating rod, of a plate-holder, a line-indicator mounted on the rod, a clutch comprising a strip of metal having a slot through which the said rod passes, the clutch and indicator-rod being arranged to move together, the said strip having a notch cut in its edge adapted to fit over the edge of the said plate, the metal of the strip above the plate being bent out of the plane of the strip, and a tailpiece formed on the strip and bent in the same direction as the jaw and adapted to engage the under side of the plate when the clutch is rocked in one direction, substantially as described.

22. In a copy-holder, the combination with a suitable support for the copy, of a reciprocating rod, a line-indicator solely supported by said rod, means for causing the line-indicator to move with said rod in one direction and for preventing movement with the line-indicator in the opposite direction, and a supporting-base for said support.

In witness whereof I have hereunto subscribed my name in the presence of two witnesses.

ARTHUR B. REID.

Witnesses:
  W. CLYDE JONES,
  HENRY W. BELFIELD.